United States Patent [19]

Salmon

[11] 4,327,050
[45] Apr. 27, 1982

[54] EXTRUSION AND PELLETING APPARATUS AND METHOD

[75] Inventor: Emigdio J. Salmon, Bartlesville, Okla.

[73] Assignee: Phillips Petroleum Company, Bartlesville, Okla.

[21] Appl. No.: 189,478

[22] Filed: Sep. 22, 1980

[51] Int. Cl.³ ............................................. B28B 11/16
[52] U.S. Cl. ............................ 264/142; 264/176 F; 425/67; 425/311; 425/464
[58] Field of Search .............. 425/311, 382, 67, 313, 425/464, 382.25; 264/176 F, 142

[56] References Cited

U.S. PATENT DOCUMENTS

| | | | |
|---|---|---|---|
| 2,408,713 | 10/1946 | Webb | 425/464 |
| 3,129,458 | 4/1964 | Mitchell | 425/464 |
| 3,259,938 | 7/1966 | Martin | 425/464 |
| 3,737,269 | 6/1973 | Grady | 425/311 |
| 3,753,637 | 8/1973 | Gasior et al. | 425/313 |
| 3,986,816 | 10/1976 | Gwinn et al. | 425/188 |
| 4,056,597 | 11/1977 | Cooper | 425/464 |

Primary Examiner—Jay H. Woo

[57] ABSTRACT

Uniformity of flow rate through an extrusion or pelleting die is provided through each of a plurality of orifices of substantially equal cross sectional area by providing a die in which the length of a narrowed portion of a downstream passageway associated with each orifice is chosen to provide the desired flow characteristics.

12 Claims, 7 Drawing Figures

EXTRUSION AND PELLETING APPARATUS AND METHOD

This invention relates to improved method and apparatus for extruding a substantially uniform flow through each of a plurality of die orifices. In another aspect the invention relates to a method and apparatus for pelletizing to achieve uniformly sized pellets. In yet another aspect the invention relates to a method and apparatus for extruding and pelleting thermoplastic material. In still another aspect the invention relates to a method and apparatus for extruding thermoplastic materials to provide a substantially uniform volumetric flow of extruded material through each of a plurality of extrusion orifices over a wide range of physical properties exhibited by the material which is extruded.

The tendency of a generally homogeneous extrudable material to exhibit varying volumetric flow rates through different portions of a die having a plurality of orifices which are substantially geometrically identical is a common problem associated with the extrusion of various types of materials. The nature and extent of flow irregularities will vary with the geometry of the particular extrusion apparatus as well as the uniformity of pressure, temperature, flow rate, and physical properties of the material to be extruded and the apparatus by which extrusion is accomplished. This nonuniformity in volumetric flow rates through different die orifices having the same geometry leads to nonuniformities in the extruded product and, particularly when the extrusion operation is part of a pelleting process, to nonuniformity and irregularity of the resulting pelleted material.

One of the characteristics noted with polymeric melt flow through pipes and/or dies, for example, is that the boundary layer next to the wall of the pipe or conduit may move relatively slowly due to frictional effects whereas the melt in the interior of the moving mass flows more rapidly. Such differences due to frictional effects often lead to or further exaggerate flow differences resulting from viscosity changes related to temperature differentials within the melt stream. For example, the slower moving polymer adjacent an unheated portion of the wall of a conduit tends to move even more slowly as it loses heat and becomes more viscous. It is clear, therefore, that it is desirable to provide a uniform a flow as possible through such conduits. When uniform flow is desired in a conduit carrying material to a die, uniform flow through all portions of the die is necessary.

In a process in which the extruded material is to be cut as it emerges into pellets which are desirably uniform in size and dimension several factors have an effect on the size and dimension of the resulting pellets. It can readily be seen that the volumetric flow rate at which material is extruded from a die orifice will have a direct effect on the length of pellets which are made when the strand of extruded melt is cut into pellets using a rotating knife at a given rpm located at the die face. It is also clear that the diameter of the opening through which the material is extruded will have an effect on the diameter of the resulting strand of extruded melt and on the diameter pellet cut therefrom. In addition, due to the extrusion characteristics related to flow rate, viscosity, temperature and other conditions, a strand of extruded melt from a die orifice having a faster flow rate and/or made with a less viscous material will often have a different diameter than a strand of melt resulting from the extrusion of a more viscous or slower moving material through the same size opening.

Given these characteristics of extrusion operation, one method of achieving uniform pellet size would be to increase the diameter of the die openings in those areas of high viscosity in order to increase the flow through the die in those areas. By properly choosing the sizes of the die openings it would be possible to balance a slightly slower flow of higher viscosity material exhibiting certain extrusion characteristics through relatively larger openings with slightly more rapid flow of lower viscosity material exhibiting different extrusion characteristics through relatively smaller openings in order to achieve an improvement in pellet uniformity. It can also be seen, however, that any variation in temperatures, extrusion pressure or rate, physical characteristics of the extruded material, or other changes would completely upset the delicate balance necessary to achieve uniform pellet size under such conditions. At the very least a different such die would be necessary for each different polymer type to be extruded in a commercial polymer production operation, and at worst the normal variations in operating conditions would be sufficient to interfere with the balance required for maintenance of uniform pellet size.

Accordingly, an object of the present invention is to provide an improved extrusion die providing substantially uniform material flow through a plurality of orifices. Another object of the invention is to provide a method and apparatus for pelletizing to achieve uniformly sized pellets. Another object of the invention is to provide a method and apparatus for extruding and pelleting thermoplastic material. Another object of the invention is to provide a method and apparatus for extruding a thermoplastic material to provide substantially uniform flow through each of a plurality of extrusion orifices over a wide range of physical properties exhibited by the extruded material.

In accordance with the invention, an extrusion die is provided having a plurality of passageways or orifices through which the material to be extruded is forced, each such passageway having a narrowed downstream portion of substantially equal cross sectional area and of varying length chosen to provide a substantially equal flow rate through each orifice. In order to permit the extrusion die of the invention to cooperate operably with a rotating cutting blade of the type employed in many types of pelleting apparatus, the substantially equal cross sectional area of the downstream opening of each extrusion passageway is located along a flat, planar surface of the extrusion die which serves as a cutting face for the rotating cutting blade. By extruding material through downstream openings of substantially equal size and at substantially equal volumetric flow rates through each such opening, the pellets produced when the strands of extrudate are cut by a rotating blade at the die face exhibit improved uniformity of size and dimension. In addition to improved uniformity when used with a specific extruded material under specific extruding conditions, a die built and used in accordance with the invention will make it possible to maintain uniformity of volumetric flow rate through the die and resulting uniformity in pellet size over a wide range of physical properties exhibited by the extruded material and operating conditions of the extruder.

Other objects and advantages of the invention will be apparent from the detailed description of the invention and the appended claims as well as from the detailed description of the drawings in which:

Although the invention is described herein in a presently preferred embodiment wherein an extrusion die constructed in accordance with the invention is utilized in an underwater pelleting process in which the extruded melt is cut with a rotating knife or knives immediately adjacent the die face, the die would be equally adaptable to a similar pelleting process in which the emerging melt in strand form is conducted through a trough of water to form solid strands which are then cut by rotating knives into pellets or with a so-called "dry face" pelleting process where the extruded melt is cooled with a forced air flow as it exits the die and is cut or where the extruded melt is cut with a rotating knife immediately adjacent the die face but is not contacted with water or other suitable cooling fluid until immediately after it has been cut.

The method and apparatus of the invention can be employed with any suitable material such as, for example, a thermoplastic polymer which is sufficiently stable to be formed into pellets by means of conventional extruding and pelleting processes. Common examples of suitable resins include polyolefins such as polypropylene, polyethylene, ethylene/1-hexene copolymers, and the like, styrene-containing resins such as butadiene/styrene block copolymers and polystyrene, amide-derived polymers such as poly(caprolactam), poly(arylene sulfide) such as poly(phenylene sulfide), poly(arylene ether) such as poly(2,6-dimethyl-1,4-phenylene ether), and other suitable materials.

Figure 1:
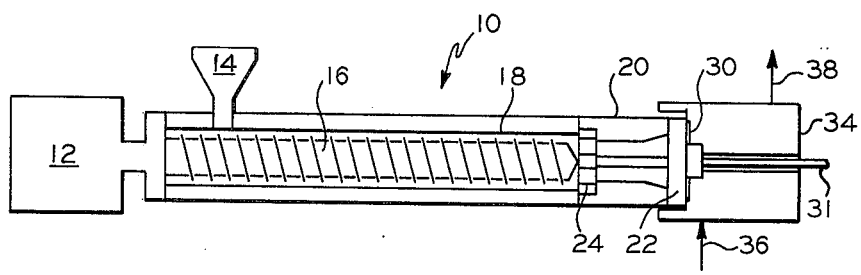
FIG. 1 is a schematic cross sectional diagram of an extruder and pelletizer of a type suitable for use in accordance with the invention.

Referring now to the drawing, and in particular to FIG. 1, there is illustrated an in-line extruder 10 having a drive motor 12, a hopper 14 in which a feed supply of unplasticized polymer is introduced, and a helical screw conveyor 16 positioned within a barrel 18 for the purpose of supplying a downstream flow of plasticized material under pressure to a downstream assembly 20 comprising a die 22, a breaker plate 24, and other apparatus known in the art for directing a flow of plasticized polymer to the die 22. Molten strands of polymer exiting the die 22 are sheared flush with the downstream face of the die 22 by rotating blades 30. A housing 34 forms a water chamber with the die face serving as one wall of the chamber. Water is introduced into the chamber 34 via water inlet line 36 and removed via water outlet line 38. A shaft 31 provides rotational power to the rotating blades 30. As the strands of extruded polymer are cut into pellets by the rotating blades 30, they are contacted with cooling water prior to coming into contact with each other in order to prevent pellet agglomeration. The die of this invention can be used either with a type of pelletizing unit in which the strands of extruded polymer are contacted with cooling fluid at the downstream face of the die 22 or with a dry die face cutter where the rotating blade 30 forces the cut pellets radially outward toward the walls of a chamber as water is introduced tangentially against the chamber walls to contact and cool the pellets before they contact each other.

Figure 2:
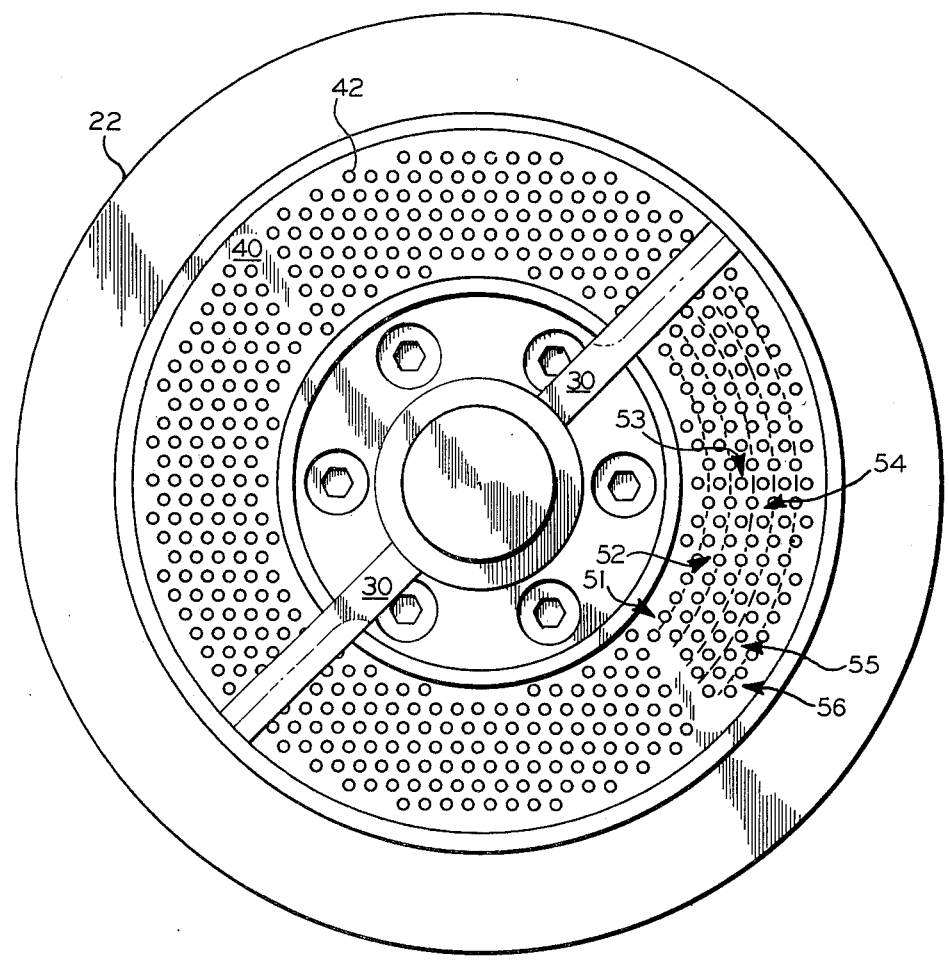
FIG. 2 is a view of the downstream face of a die plate and associated pelletizing apparatus employed with the extruder of FIG. 1.

Referring now to FIG. 2, the downstream face 40 of the die 22 is shown. The openings 42 of the die orifices are located within an annular ring on the downstream face 40 of the die 22 so that the rotating knife blades 30 can apply the required cutting force to the strands of extruded polymer thereby cutting the strands into pellets. Although only two knife blades 30 have been shown, any suitable number can be used. In normal operation there will be from 2 to 12 such blades and from 6 to 12 blades are used in the majority of commercial polymer production, depending on the characteristics of the polymer to be pelleted.

In order to provide for a uniform flow rate of polymer through each of the substantially equal sized downstream openings 42 in the die 22 it is convenient for purposes of discussion and design to divide the surface of the downstream die face 40 into a plurality of zones. While the number, shape, and size of such zones which may be usefully employed with any particular embodiment of the invention will depend upon the shape of the die 22 and the pattern formed by the downstream openings 42 in the die face 40. For the embodiment illustrated wherein 478 downstream openings 42 are located in an annular array at the downstream face 40 of the die 22, the downstream openings 42 can be classified by their location within one of six zones 51–56 which are annular zones defined by the planar space between concentric circles of increasing radius. The zones should be chosen in such a manner that all downstream openings 42 within a particular zone will ordinarily be subjected to substantially uniform polymer melt conditions under all conditions of extruder operation to be encountered. As will be explained hereinafter, the portion of the die passageway associated with each downstream opening 42 within each zone 51–56 will be suitably constructed or modified in accordance with the invention to provide a substantially uniform flow of extruded polymer through each downstream opening 42 under operating conditions.

Figure 3:
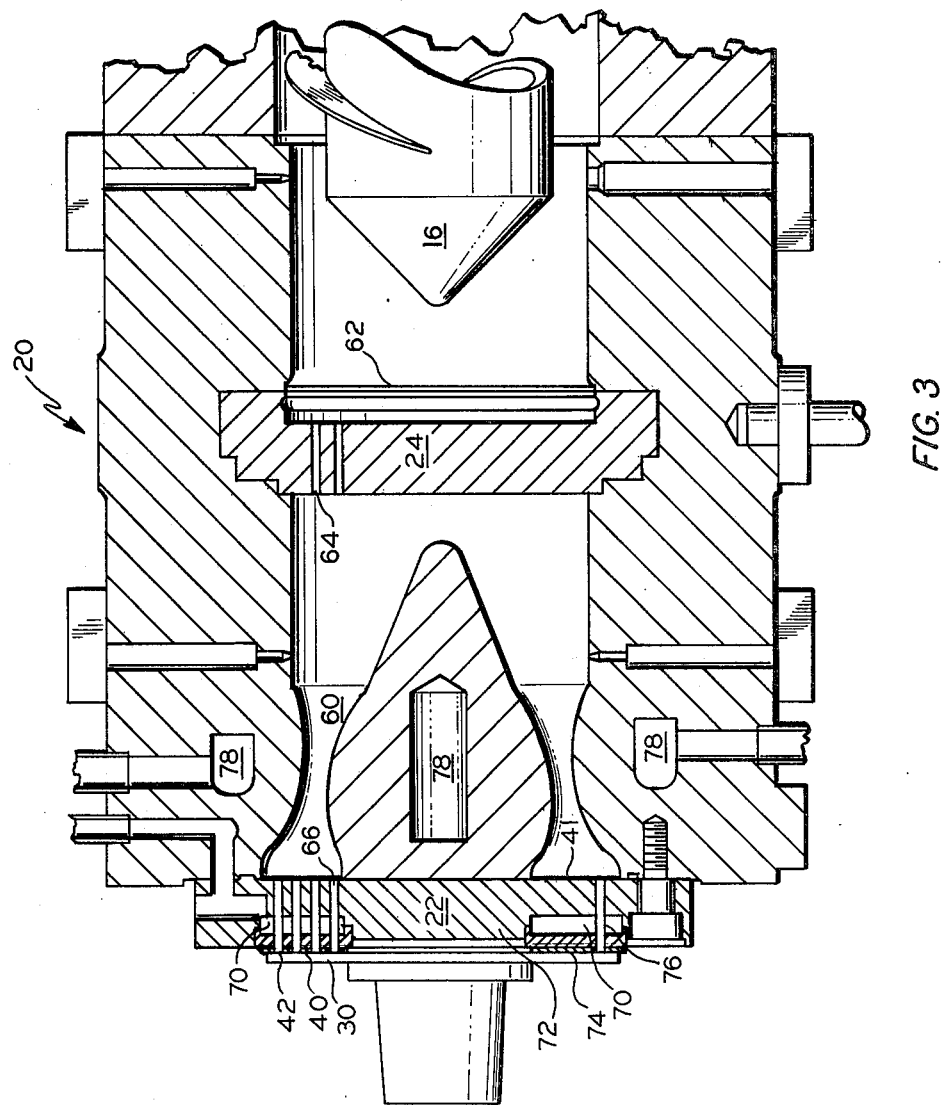
FIG. 3 is a partial cross sectional view of the extruder of FIG. 1.

FIG. 3 illustrates in more detail the cross sectional configuration of the downstream assembly 20 of the extrusion and pelleting apparatus of FIG. 1. As the helical screw conveyor 16 delivers molten thermoplastic polymer in a downstream direction, the polymer flows through a screen pack 62 which prevents further travel of any foreign matter which may be present in the polymer melt and through a large number of holes 64 in the breaker plate 24 into an annular conduit 60 through which it is conveyed to the upstream face 41 of the die 22. The annular ring of passageways 66 through the die 22 communicate at their upstream side with the annular conduit 60 and lead to the downstream openings 42 on the downstream face 40 of the die 22. Although the passageways 66 can be formed in any suitable manner, in the embodiment shown the die 22 is made up of a body section 72 and an annular die plate 74 with the die plate 74 and body 72 forming a cavity 70. Together the body 72, die plate 74 and inserts 76 make up the base of the die 22. In an embodiment not requiring a cavity 70 for circulation of heating fluid, the base of the die 22 could be made of a single body member or a body member with a die plate 74. The die plate 74 serves as a cutting face and is normally made of a hardened material such as hardened tungsten carbide steel. It can be constructed of a single piece of material or can be formed with a surface such as a mozaic pattern of separate elements for each of the passageways 66 attached to a support member. The passageways 66 are defined by inserts 76 extending through the body 72 and cavity 70 to the die plate 74. The purpose of this construction is to provide for circulation of heating fluid such as steam or heated oil in heat exchange relationship through the cavity 70 to maintain the temperature of the polymer near the downstream face 40 of the die 22. In the embodiment illustrated heating fluid such as steam or oil is also circulated through other cavities 78 to maintain the desired temperature of the polymer within the annular conduit 60. The rotating blades 30 are positioned adjacent the downstream face 40 of the die 22 in order to cut the extrudate exiting the die 22 through the downstream openings 42 thereof into pellets as it emerges from the die.

Figure 4:
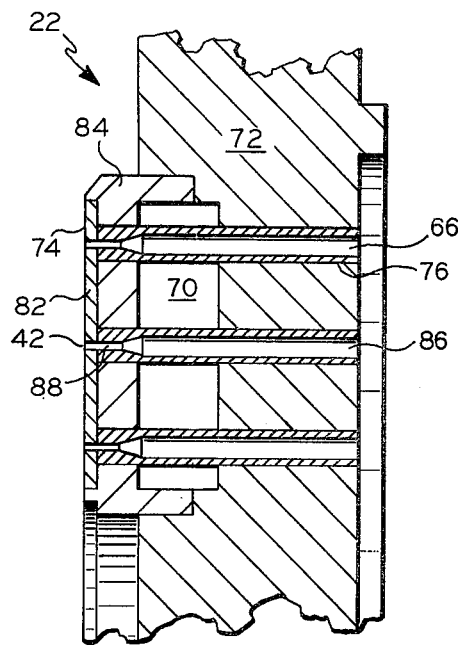
FIG. 4 is a partial cross section illustrating the relative shape of orifice profiles used by the prior art.

A more detailed partial view of the portion of the die 22 through which the passageways 66 run is shown in FIG. 4. The die plate 74 in this case is formed of a face of hardened tungsten carbide steel 82 in cooperation with a support member 84 which is attached to the body 72 of the die 22. The inserts 76 define passageways 66 having an upstream portion 86 which is relatively large in cross sectional area and a downstream portion 88 of a smaller cross sectional area. The downstream opening 42 of the passageway 66 is of the same cross sectional area and shape as the cross sectional area and shape of the downstream portion 88. The embodiment illustrated by FIG. 4 is typical of the die to be found in the prior art, in that the downstream portion 88 of each passageway 66 is of substantially the same length. It can be seen that when the viscosity of material to be extruded entering the upstream portion 86 of each of the passageways 66 is not the same, the more viscous material will move more slowly through the passageways 66 to which it flows, and the less viscous material will flow through the passageways 66 which it encounters at a more rapid rate. As a consequence of this condition, the pellets cut from the extrudate exiting the downstream openings 42 of the passageways 66 may have significantly varying sizes.

Figure 5:
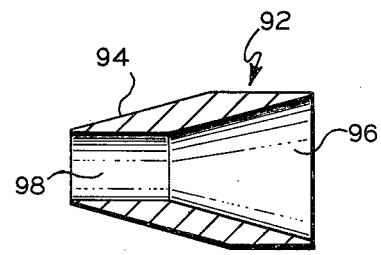
FIG. 5 is a cross-sectional view of an orifice insert suitable for use in implementing the invention.

FIG. 5 illustrates in cross section a type of adaptor which can be advantageously employed in accordance with the invention to equalize the flow rate through the various passageways 66. The adaptor 92 comprises a single piece of suitable material such as stainless steel, for example, having a shape defined by a frustoconical downstream end 94 and a parallel frustoconical upstream end 96 concentrically positioned within a cross sectional shape, a cylinder in the preferred embodiment, matable with the inside wall of the insert 76 which defines the upstream portion 86 of the passageway 66 with which the adaptor 92 is to be used, and having a passageway 98 therethrough which is of the same cross sectional area and shape as the downstream portion 88 of the passageway 66.

Figure 6:
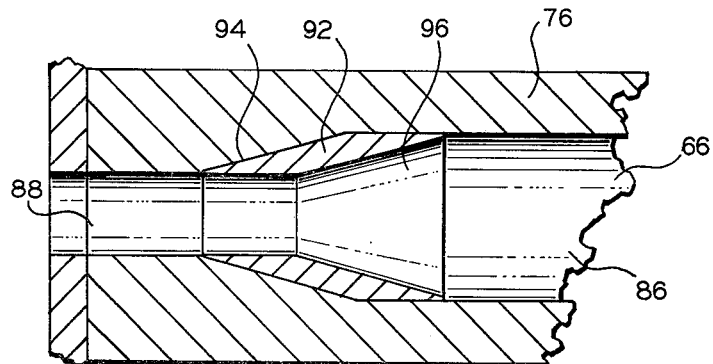
FIG. 6 is a partial cross sectional view of a die orifice employing the orifice insert of FIG. 5 in accordance with the invention.

FIG. 6 illustrates the manner in which the adaptor 92 can be inserted into the upstream portion 86 of the passageway 66 formed by the insert 76 in order to effectively increase the length of the downstream portion 88 of the passageway 66. In the particular embodiment illustrated, the frustoconical downstream edge 94 of the adaptor 92 has been chosen to mate with the frustoconical taper of the passageway 66 as it narrows from the larger cross sectional upstream portion 86 to the smaller cross sectional downstream portion 88. Although the upstream end 96 of the adaptor 92 illustrated has the same frustoconical shape as the original frustoconical taper within the passageway 66 any suitable shape may be employed for directing melt flow from the upstream portion 86 to the downstream portion 88 of the passageway 66.

In order to adapt a die 22 such as the illustrated die of FIGS. 3 and 4 for operation in accordance with the invention, the passageways 66 associated with each of the downstream openings 42 within each of the zones 51–56 are fitted with adaptors 92 having a passageway 98 of the required length to provide equalization of extruded flow rates among the selected zones 51–56. Each of the adaptors 92 employed within a given zone 51–56 will have a passageway 98 of the same length. Ordinarily, the passageways 98 of adaptors used in different zones will be of different lengths, but it is within the scope of the invention to use adaptors 92 having passageways 98 of the same length in more than one zone. The choice of adaptor length will, like the choice of zones, be dependent upon the particular flow geometry and conditions encountered. In some cases a preliminary determination of the approximate adaptor lengths required may be accomplished by mathematical analysis using standard flow calculations and assumptions. Since the flow characteristics of thermoplastic polymers and other similar materials are not easily predictable under commercial operating conditions, observation of existing pellet size characteristics, temperature measurements indicative of relative polymer viscosity in the passageways 66 within various zones 51–56 and other similar empirical data will be of assistance in determining the final dimension of the adaptors 92 to be employed.

While the permanent use of adaptors 92 in some or all of the passageways 66 of a die 22 is advantageous and commercially feasible, the installation and maintenance of, for example, 478 adaptors in the passageways of the die illustrated in FIGS. 2 and 3 can be cumbersome. Once the desired lengths of downstream passageways 88 within each of the zones 51–56 has been determined by calculation and experimentation and possibly by testing the desired configuration using adaptors 92 installed within a commercially available die, a presently preferred embodiment of the invention is the construction of a die which does not require the use of adaptors to achieve the desired passageway configuration.

Figure 7:
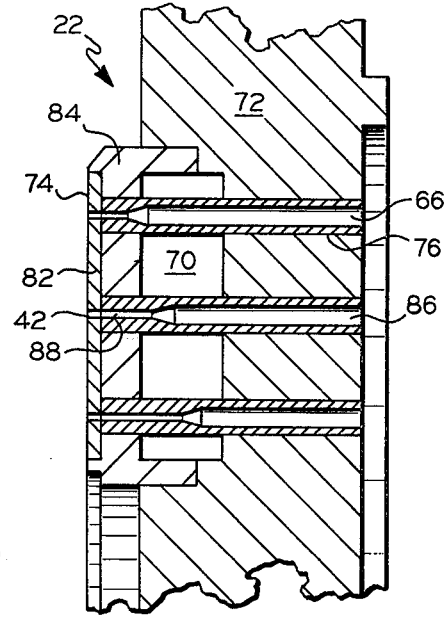
FIG. 7 is a partial cross sectional view of a die plate constructed in accordance with the invention.

FIG. 7 is a partial cross section illustrating the construction of a die in such a manner. Having determined the appropriate length of downstream portion 88 required in each passageway 66 to achieve uniform polymer flow, the inserts 76 of different zones are constructed to provide the chosen length of the downstream portion 88.

EXAMPLE

An existing underwater pelletizing die manufactured by the Farrel Machinery Group, USM Corporation of Ansonia, Connecticut, was divided into 6 concentric zones of downstream openings as illustrated by FIG. 2 and was modified by inserting an adaptor into the passageway associated with each downstream opening. The concentric zones, numbered 1–6 from the inside to the outside of the annular die configuration contained the number of holes indicated in the following table and were fitted with adaptors increasing the length of the narrowed downstream passageway by the amount also indicated in the following Table I:

TABLE I

| Zone | No. of Holes | Adaptor Length Inches | Total Land* Length |
|---|---|---|---|
| 1 | 30 | 0.387 | 0.767 |
| 2 | 100 | 0.320 | 0.700 |
| 3 | 76 | 0.320 | 0.700 |
| 4 | 90 | 0.287 | 0.667 |
| 5 | 96 | 0.254 | 0.634 |
| 6 | 86 | 0.220 | 0.600 |

*Total length of narrowed downstream passageway including original length and added adaptor length.

The 478 downstream openings of the die has a total opening area of approximately 3.24 square inches or an individual opening diameter of approximately 0.0875 inches with the original narrowed downstream portion of the polymer passageway being approximately 0.380 inches. With the addition of the adaptors, the narrowed downstream passageways varied in length from approximately 0.767 inches in zone 1 to approximately 0.600 in zone 6. The original larger upstream portions of the passageways were approximately 0.22 inches in diameter and approximately 2.16 inches in length and were shortened by the length of the respective adaptors inserted within them. The die thus modified was attached in the normal fashion to the extruder section of a 9-inch Farrel Continuous Mixer/Hot Melt Extruder manufactured by the Farrel Machinery Group, USM Corporation of Ansonia, Connecticut.

Polypropylene having a nominal 3.5 melt flow (ASTM D 1238-65T, condition L, e.g. 3.5 grams per 10 minutes) was extruded through the modified die into water where die face cutters consisting of revolving knives converted the emerging extrudate stands into pellets. The pellet/water slurry was directed into a recovery zone where the pellets were separated from the water, dried, the production weight per hour ascertained, and the pellets were sent to storage. The water was recycled to the pelletizing zone. Pellet samples were taken at intervals to monitor the effect of the modified die plate on pellet quality. Observation of the individual pellets within the samples disclosed that the pellets were of two distinct types, normal pellets making up approximately 90 percent of the pellet sample, and large pellets making up the remaining 10 percent of the sample. This procedure was repeated in two additional runs using different conditions. Individual pellets within the samples were measured and compared with pellets made under similar conditions in control runs using an unmodified die. The results of the pellet analysis are contained in Table II:

TABLE II

| Run | Pellet Length (In) Range | Pellet Length (In) Average | Pellet Diameter (In) Range | Pellet Diameter (In) Average |
|---|---|---|---|---|
| Example 1 | | | | |
| Large Pellets (8.8%) | 0.126–0.185 | 0.152 | 0.154–0.166 | 0.161 |
| Normal Pellets (91.2%) | 0.087–0.106 | 0.096 | 0.128–0.140 | 0.134 |
| Example 2 | | | | |
| Large Pellets (16.8%) | 0.152–0.241 | 0.202 | 0.159–0.171 | 0.166 |
| Normal Pellets (83.2%) | 0.095–0.112 | 0.105 | 0.123–0.138 | 0.128 |
| Example 3 | | | | |
| Large Pellets (12.5%) | 0.183–0.251 | 0.210 | 0.166–0.178 | 0.170 |
| Normal Pellets (87.5%) | 0.114–0.146 | 0.129 | 0.140–0.148 | 0.144 |
| Control 1 | 0.083–0.147 | 0.114 | 0.109–0.168 | 0.149 |
| Control 2 | 0.075–0.169 | 0.107 | 0.121–0.174 | 0.150 |

Specific operating conditions for the various Example and Control runs were as shown in Table III:

TABLE III

| Hot Melt Extruder Conditions | Example 1 | Example 2 | Example 3 | Control 1 | Control 2 |
|---|---|---|---|---|---|
| Screw Speed, rpm | 70 | 70 | 72 | 78 | 95 |
| Gross Motor Load, KW | 380 | 370 | 360 | 210 | 400 |
| Melt Temperature, °F. | 395 | 400 | 440 | 425 | 460 |
| Gate Pressure, psig | 1750 | 1700 | 1650 | 1850 | 2350 |
| Die Pressure, psig | Not Working | | | 1250 | 1650 |
| Hot Oil Temperature, °F. | 525 | 525 | 525 | 480 | 520 |
| Pelletizer Speed, rpm | 1550 | 1550 | 1550 | 1300 | 1700 |
| Resin Melt Flow | 3.5 | 2.9 | 2.9 | 12 | 3.0 |
| Production Rate, lbs./hour | 9480 | 8160 | 10,500 | 11,520 | 13,500 |

In addition to providing improved pellet uniformity, operation using the die modified in accordance with the invention resulted in fewer agglomerated or strangely-shaped pellets and less fine non-pelleted polymeric matter being present among the pelleted product.

Although it can be seen that the variation of pellet sizes within the normal and large sample groups obtained in the test indicated improved uniformity in pellet size and dimension, there was no apparent explanation of the fact that two readily distinguishable sizes of pellets had been produced. The adapted die was later dismantled and inspected, and it was found that of the 478 holes one was completely blocked, 91 percent contained inserts, no inserts had been installed in 7 percent of the holes, and 2 percent of the holes contained 2 inserts each. This finding underscores the tedious nature of inserting adaptors into each of 478 passageways and the preference of the presently most preferred embodiment of the invention wherein the die itself is constructed to the final dimensions desired. The use of the adaptors was quite helpful, however, in confirming the ability of the die configuration to provide the uniform flow and resulting uniform pellet size desired.

Based on observation and measurements in operating the die of the example, the determination of appropriate adaptor length was further refined to yield the presently most preferred adaptor or additional length to be used with the die plate of the example as shown in Table IV:

TABLE IV

| Zone | No. of Holes | Total Land* Length Inches |
|---|---|---|
| 1 | 30 | 0.660 |
| 2 | 100 | 0.575 |
| 3 | 76 | 0.595 |
| 4 | 90 | 0.545 |
| 5 | 96 | 0.530 |
| 6 | 86 | 0.500 |

*Total length of narrowed downstream passageway including added adaptor length, if used.

While the invention has been described in terms of presently preferred embodiments thereof, reasonable variations and modifications are possible by those skilled in the art within the scope of the described invention and the appended claims thereto.

That which is claimed is:

1. A method for pelletizing a thermoplastic material comprising:

supplying a flow of molten thermoplastic material, forming said flow of molten material into a plurality of individual streams having substantially equal cross sectional area and substantially equal stream flow velocity at a preselected plane of reference by passing each said stream through a passageway having an upstream portion of a first length and a first relatively large cross sectional area and a downstream portion of a second length and a second relatively small cross sectional area, each said second length being selected from one of at least two different chosen lengths to provide substantially equal stream flow velocity therethrough, and dividing each of said individual streams into substantially equal pellet lengths at said plane of reference.

2. A method in accordance with claim 1 additionally comprising contacting each of said individual streams with a coolant fluid at said plane of reference.

3. An extrusion die comprising a base having a plurality of passageways through which material is extruded, each said passageway comprising an inlet opening having adjacent thereto an upstream inlet portion of a first cross sectional area and an outlet opening having a second cross sectional area and having adjacent thereto a down stream outlet portion of said second cross sectional area, said second cross sectional area being substantially the same for each said passageway and being smaller than said first cross sectional area wherein the portion of said base defining the outlet opening of each said passageway is a planar surface and wherein the length of each said downstream outlet portion is selected from one of at least two different chosen lengths, each said chosen length being used as the length of said downstream outlet portion of at least one said passageway.

4. An extrusion die means in accordance with claim 3 wherein the portion of said base defining the inlet opening of each said passageway is a planar surface.

5. An extrusion die means in accordance with claim 4 wherein said planar surface defining the outlet opening of each said passageway is generally parallel to said planar surface defining the inlet opening of each said passageway.

6. An extrusion die means in accordance with claim 3 wherein said planar surface defining the outlet opening of each said passageway is adapted to serve as a cutting face.

7. An extrusion die means in accordance with claim 6 wherein said planar surface defining the outlet opening of each said passageway comprises at least one hardened metal plate.

8. An extrusion die in accordance with claim 6 or 7 wherein the portion of said base defining the inlet opening of each said passageway is a planar surface which is generally parallel to the planar surface defining the outlet opening of each said passageway.

9. Apparatus comprising:

means for supplying a flow of molten material to be pelleted under pressure, and die means for accepting said flow of molten material and forming said molten material into a plurality of streams each having substantially the same cross-sectional area and each exiting said die means at substantially the same flow rate, said die means comprising a base having a plurality of passageways therethrough, each said passageway comprising an inlet opening having adjacent thereto an upstream inlet portion of a first cross sectional area a downstream outlet opening, each said downstream outlet opening being of substantially the same second cross-sectional area, and each said downstream outlet opening being located upon a downstream planar surface of said die means and a downstream outlet portion adjacent each said downstream outlet opening, said downstream inlet portion being of the same cross-sectional area as said downstream outlet opening and of smaller cross sectional area than said upstream inlet portion, the length of each said downstream outlet portion being selected from one of at least two different chosen lengths, each said chosen length being used as the length of said downstream outlet portion of at least one said passageway.

10. Apparatus in accordance with claim 9 additionally comprising rotating blade means operably associated with said downstream planar surface of said die means for dividing said plurality of streams into segments of substantially equal length.

11. Apparatus in accordance with claim 8 additionally comprising means for contacting each of said plurality of streams with a coolant fluid at said downstream planar surface of said die means.

12. Apparatus in accordance with claim 9 wherein the portion of said base defining the inlet opening of each said passageway is a planar surface which is generally parallel to said downstream planar surface.

* * * * *

UNITED STATES PATENT AND TRADEMARK OFFICE
CERTIFICATE OF CORRECTION

PATENT NO. : 4,327,050
DATED : April 27, 1982
INVENTOR(S) : Emigdio J. Salmon

It is certified that error appears in the above—identified patent and that said Letters Patent is hereby corrected as shown below:

Column 10, line 46 (claim 11, line 1), "8" should read --- 10 ---.

Signed and Sealed this

Third Day of August 1982

[SEAL]

Attest:

Attesting Officer

GERALD J. MOSSINGHOFF

Commissioner of Patents and Trademarks